US009582343B2

(12) United States Patent
Yang

(10) Patent No.: US 9,582,343 B2
(45) Date of Patent: Feb. 28, 2017

(54) KEY INPUT PROCESSING IN VIRTUALIZED COMPUTING ENVIRONMENT

(71) Applicant: VMware, Inc., Palo Alto, CA (US)

(72) Inventor: Ji Yang, Beijing (CN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 15/169,390

(22) Filed: May 31, 2016

(65) Prior Publication Data

US 2016/0274959 A1    Sep. 22, 2016

Related U.S. Application Data

(63) Continuation of application No. 14/636,608, filed on Mar. 3, 2015, now Pat. No. 9,354,913.

(51) Int. Cl.
G06F 13/00 (2006.01)
G06F 9/54 (2006.01)
G06F 9/455 (2006.01)

(52) U.S. Cl.
CPC ........... G06F 9/546 (2013.01); G06F 9/45558 (2013.01); G06F 9/542 (2013.01); *G06F 2009/4557* (2013.01)

(58) Field of Classification Search
CPC ....... G06F 9/45533; G06F 9/541; G06F 9/546
USPC ..................... 718/1; 719/313, 319
See application file for complete search history.

(56) References Cited

U.S. PATENT DOCUMENTS

| 7,574,709 B2 | 8/2009 | Erlingsson |
| 7,721,299 B2 | 5/2010 | van Riel |
| 2013/0227555 A1* | 8/2013 | Tsirkin ................ G06F 9/45558 718/1 |

* cited by examiner

*Primary Examiner* — Andy Ho

(57) ABSTRACT

An example method is provided to process an input in a virtualized computing environment. The virtualized computing environment may include a physical machine running a host operating system and a virtualization software with one or more virtual machines. The example method may include detecting activation of at least one key input that causes a first message to be generated, the first message associated with the key input, comparing the first message with a set of stored messages, wherein any of the set of stored messages can be properly executed by targets in both the host operating system and the virtual machine but with different responses, and determining, based on the comparing, whether the first message is intended for a target in the host operating system or in the virtual machine.

20 Claims, 3 Drawing Sheets

KEY INPUT PROCESSING IN VIRTUALIZED COMPUTING ENVIRONMENT

CLAIM OF PRIORITY

This application claims priority to and is a continuation of U.S. patent application Ser. No. 14/636,608, filed on Mar. 3, 2015, entitled "KEY INPUT PROCESSING IN VIRTUALIZED COMPUTING ENVIRONMENT", issued as U.S. Pat. No. 9,354,913, which is incorporated herein by reference in its entirety.

BACKGROUND

Unless otherwise indicated herein, the approaches described in this section are not admitted to be prior art by inclusion in this section.

Application software (or "application" for short) is generally dependent on system software to execute. In some instances, compatibility issues would arise when an application developed to dependent on one type of system software is executed with another type of system software. For example, some applications may only run on a particular operating system (e.g., Microsoft Windows 8 or Mac OS X) but not on other operating systems.

Some virtualization solutions may address the compatibility issues set forth above. A virtualization solution may include a physical machine. The physical machine is configured to run a host operating system (e.g., Mac OS X) and execute virtualization software (e.g., hypervisor). Based on the virtualization software and the hardware resources on the physical machine, a virtual machine configured to run a guest operating system (e.g., Microsoft Windows 8), which may differ from the host operating system of the same physical machine, may be created. Accordingly, the host operating system and the guest operating system, both running on the same physical machine, may support their corresponding sets of applications.

During the execution of the virtualization solution, an input device (e.g., a keyboard) may be configured to generate commands and direct the generated commands to the physical machine. However, with the different operating systems running in the same physical machine, some commands may not be properly recognized or processed.

DETAILED DESCRIPTION

Figure 1:
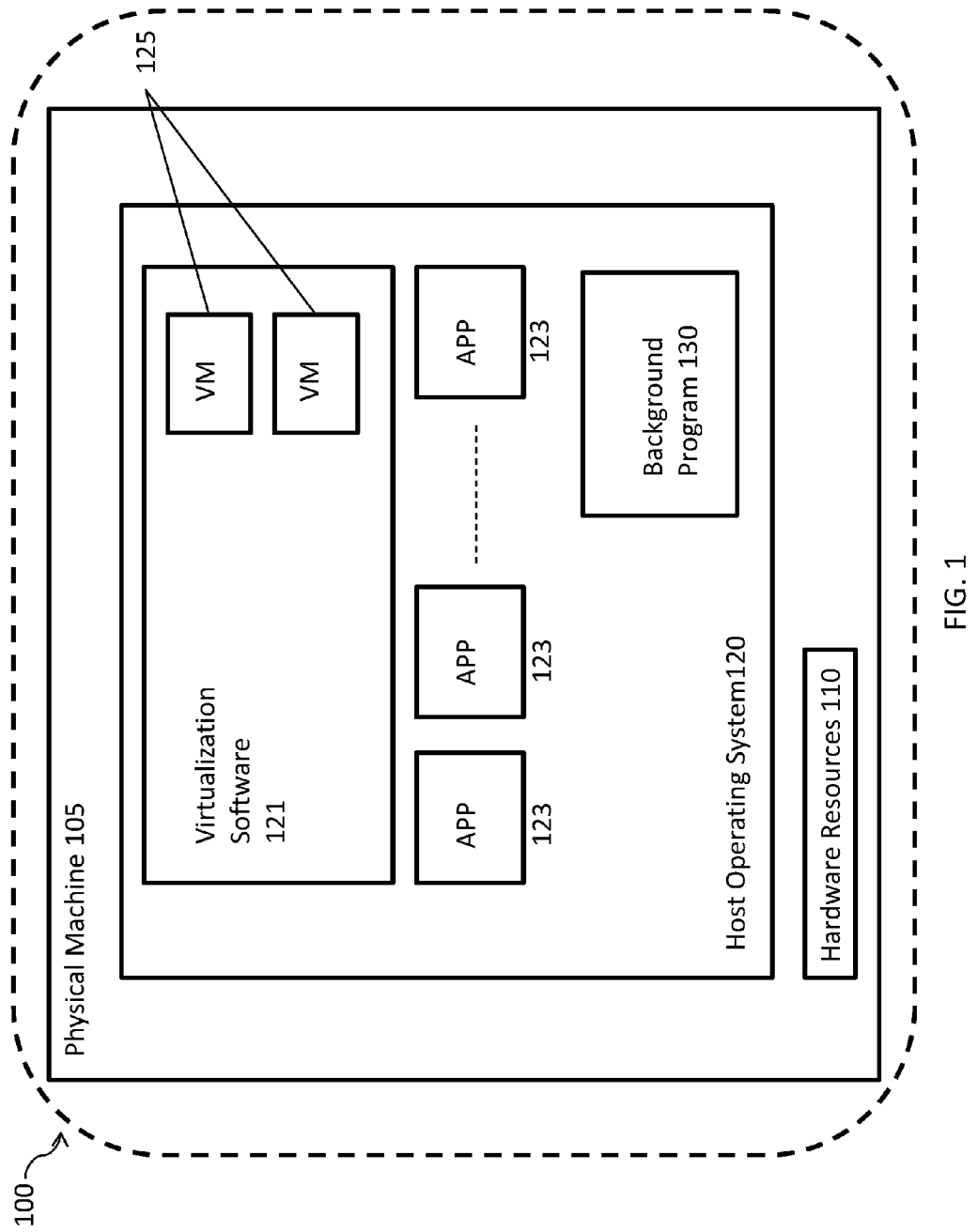
FIG. 1 is an example block diagram of a virtualized computing environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

In the disclosure, the term "virtual machine" (also referred to as VM) may refer generally to an isolated user space instance such as a virtual machine running within a virtualized computing environment (e.g., FIG. 1). Although virtualization computing environment 100 is used as an example here, other technologies aside from hardware virtualization may be used to provide isolated user space instances. For example, virtual machines 125 in FIG. 1 may be containers, virtual private servers, etc. In another example, virtual machines 125 may be complete computation environments, containing virtual equivalents of the hardware and system software components of a physical system.

The term "virtualization software" may refer generally to software which maps physical hardware resources to resources for a virtual machine (e.g., virtualization software 121 in FIG. 1). A "host operating system" or a "host" generally refers to an operating system on which the virtualization software runs (e.g., host operating system 120 in FIG. 1). A "guest operating system" or a "guest" generally refers to a virtualized operating system that runs inside the virtualization software. A "host application" is an application that runs on the host operating system (e.g., host app 123 in FIG. 1). A "guest application" is an application that runs on the guest operating system.

The term "message passing" may refer generally to a technique for invoking behaviour on a computer. This technique involves sending a message to a process and relies on the process and the supporting infrastructure to select and invoke actual code to run. For example, an invoking program (e.g., a host operating system) may pass a message to a target process or object (e.g., a window) and rely on the target to select and execute the appropriate code.

To illustrate, in response to a key input, an interrupt may be generated for a host operating system. When the host operating system services the interrupt and essentially detects the activation of the key input, it may also generate a message corresponding to this key input and determine where to direct the message to.

An input that is associated with a message to which a host operating system and a guest operating system would process and respond differently is generally referred to as a "conflict input." In conjunction with FIG. 1, suppose host operating system 120 corresponds to the Mac OS X, virtualization software 121 corresponds to VMware Fusion, and the guest operating system on virtual machine 125 corresponds to the Microsoft Windows. With VMware Fusion, suppose further that an application is being installed on virtual machine 125. During the installation process, if the "F10" key is pressed and the message associated with the F10 key input is received by the guest operating system of virtual machine 125, then the specific response from the guest operating system may correspond to entering a setup routine. On the other hand, if the press of the "F10" key is only processed by the Mac OS X, then the specific response instead corresponds to muting the audio of physical machine 105. Since the responses from the guest operating system on virtual machine 125 and host operating system 120 are different, this input, the F10 key input is considered to be a "conflict input."

Another example of a conflict input may be the F11 key input. For example, during an application installation process in virtual machine 125, the guest operating system of virtual machine 125 may wait to receive the F11 key input to proceed with the application installation process. However, in some circumstances, the press of the "F11" key is only processed by the Mac OS X and results in "show desktop" of the Mac OS X.

In yet another example, the F12 key input may also be considered as a conflict input. For example, at the end of an application installation process in virtual machine 125, the guest operating system of virtual machine 125 may wait to receive the F12 key input to terminate the application installation process. However, in some circumstances, the press of the "F12" key is only processed by the Mac OS X and results in "show dashboard" of Mac OS X.

FIG. 1 is an example block diagram of a virtualized computing environment. Virtualized computing environment 100 includes physical machine 105, which may run virtualization software 121 and may include suitable hardware resources 110 to support multiple virtual machines 125. Virtualization software 121 maintains a mapping between the resources allocated to virtual machines 125 and physical hardware resources 110 of physical machine 105.

Hardware resources 110 may include, without limitation, storage devices, input devices, network devices, memory systems, processors, controllers, display subsystems, and others. With the mapping maintained by virtualization software 121, any input received and generated by the input devices of physical machine 105 may be directed to any of virtual machines 125.

Physical machine 105 also may run host operating system 120 and multiple host applications 123. Any of virtual machines 125, similar with physical machine 105, may run its own guest operating system and guest applications compatible with the guest operating system.

Host operating system 120 and multiple guest operating systems may concurrently run in virtualized computing environment 100. Similarly, host applications 123 and guest applications compatible with the guest operating system may run concurrently on physical machine 105 as well.

In some embodiments, when virtualization software 121 is launched, background program 130 (e.g., daemon or agent) is also launched. Background program 130 is generally not under the direct control of an interactive user. Background program 130 may be configured to monitor and process messages before they reach their target processes. Background program 130 may also access a library and compare the monitored message with information stored in the library. One example library may include messages that are associated with all known conflict inputs (e.g., the aforementioned F10, F11, and F12 keys). The library may be maintained or edited, so that the messages in the library may be added or removed. In response to identifying a match between a monitored message and a message associated with a conflict input, background program 130 may be configured to generate a notice to a user of physical machine 105 to potentially solicit additional input(s).

Continuing with the aforementioned F10 key input example, if background program 130 does not exist in virtualized computing environment 100, then the message associated with the F10 key input may be directed by host operating system 120 to the target process and does not have a chance to reach the guest operating system of virtual machine 125.

Figure 2:
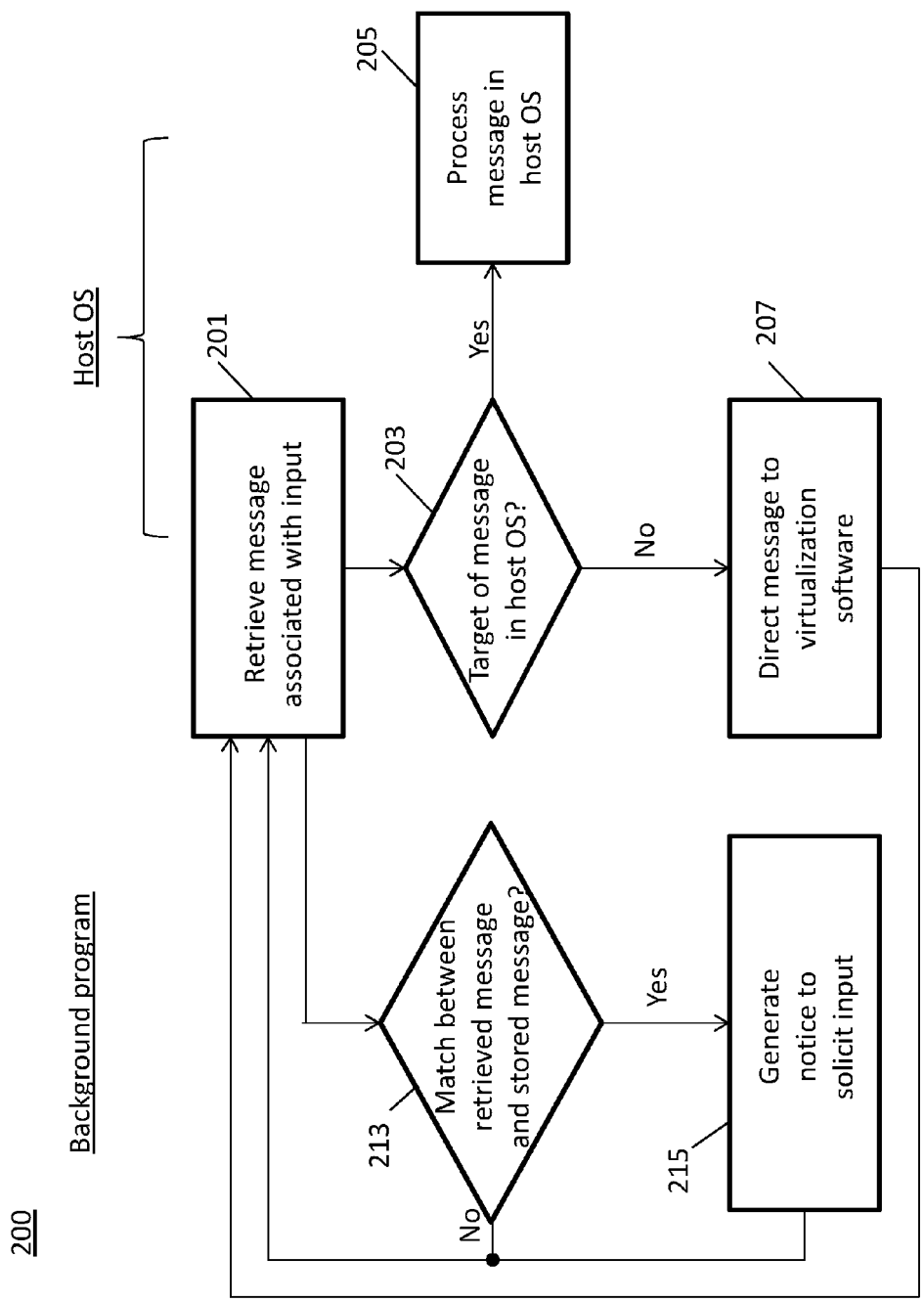
FIG. 2 is a flowchart of an example process to process an input in a virtualized computing environment, within which virtualization software and a background program have already been launched.

FIG. 2 is a flowchart of an example process to process an input in a virtualized computing environment, within which virtualization software and a background program have already been launched. Example process 200 may include one or more operations, functions, or actions illustrated by one or more blocks, such as blocks 201 to 215. The various blocks may be combined into fewer blocks, divided into additional blocks, and/or eliminated based upon the desired implementation.

In some embodiments, in conjunction with virtualized computing environment 100 illustrated in FIG. 1, blocks 213 and 215 may be performed by background program 130, and the other blocks in process 200 may be independently performed by host operating system 120.

After an input is received by physical machine 105, and a corresponding message is generated, at block 201, host operating system 120 retrieves the message.

Before the message reaches its target, block 201 may be followed by block 213, where background program 130 may monitor message traffic associated with the inputs received by physical machine 105 and compare the retrieved message with the messages stored in an accessible library. Using the example discussed above, the stored messages may correspond to one or more conflict inputs. If background program 130 does not find a match, then the program will not take any actions. Block 213 may then be followed by block 201.

At block 203, host operating system 120 determines whether the target of the message is intended to be in host operating system 120. For example, the target may be app 123 or another process or object running on host operating system 120. If indeed the target is in host operating system 120, block 203 may be followed by block 205. At block 205, the message is passed to the target in host operating system 120 and is processed by a procedure registered to the target.

On the other hand, if host operating system 120 determines that the message is not for a target in host operating system 120, then the message is directed to virtualization software 121. Virtualization software 121 then determines which virtual machine 125 and which target process or object in the virtual machine to send the message to.

If background program 130 identifies a match between the monitored message and one of the stored messages at block 213, then block 213 may be followed by block 215, where a notice is generated to solicit one or more additional inputs, so that host operating system 120 can have additional information to determine whether the input is for a target in host operating system 120 or one of virtual machines 125. For example, a notice may be presented to the user of physical machine 105 to indicate whether the input is for a selected virtual machine 125.

To illustrate using the aforementioned F10 key input example. Because F10 is a conflict input, the audio of physical machine 105 is muted and background program 130 identifies a match in 213 and generates a notice for the user of physical machine 105. In response to the notice, if the user enters an input indicating that the press of F10 is intended for host operating system 120, then the message associated with the F10 key input is processed in block 205, and the audio of physical machine 105 remains muted. Alternatively, if the user enters an input indicating that the press of F10 is intended for a selected virtual machine 125, then the message associated with the F10 key input is directed to virtualization software 121 in block 207.

Since the processing of blocks 213 and 215 is independent from the processing of blocks 203, 205, and 207, in some embodiments, the conflict input may be processed in both host operating system 120 and the guest operating system of virtual machine 125. In other words, using the F10 key input as an example, the muting of audio and the response resulting from the processing of the message in virtual machine 125 may both occur.

Figure 3:
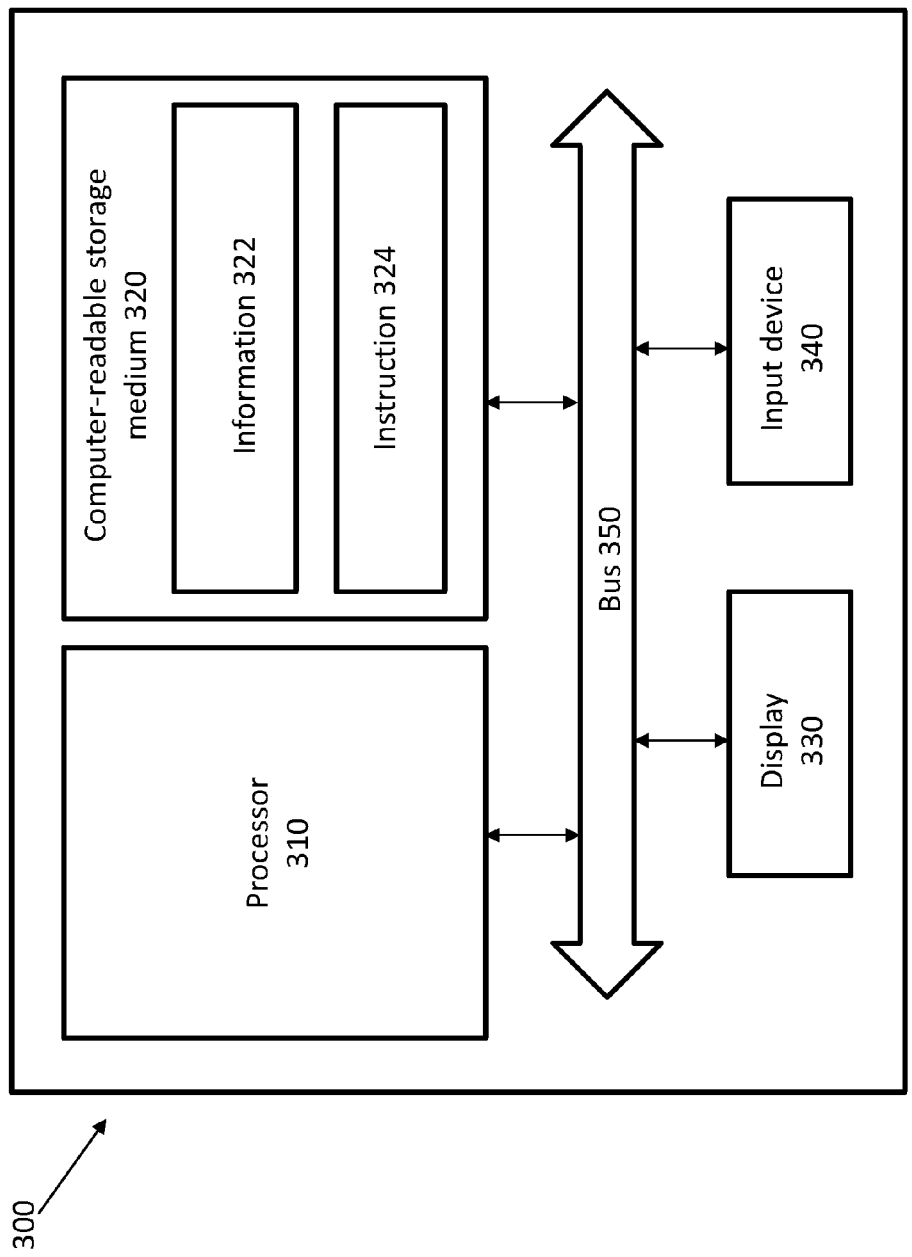
FIG. 3 is a schematic diagram of an example computer system configured the virtualized computing environment illustrated in FIG. 1.

The above examples can be implemented by hardware, software or firmware or a combination thereof. FIG. 3 is a schematic diagram of an example computer system 300 configured to support virtualized computing environment 100 illustrated in FIG. 1. Example computer system 300 may include processor 310, computer-readable storage medium 320, display 330, input device 340, and bus 350 that facilitates communication among these illustrated components and other components.

Computer-readable storage medium 320 may store any suitable information 322, such as, without limitation, messages associated with conflict inputs. Computer-readable storage medium 320 may further store computer-readable instructions 324 which, in response to execution by processor 310, cause processor 310 to perform at least the processes described herein with reference to FIG. 2. Processor 310 may also be configured to run host operating system 120, background program 130, and virtualization software 121.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or firmware to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). For example, a computer-readable storage medium includes recordable/non recordable media (e.g., read-only memory (ROM), random access memory (RAM), magnetic disk storage media, optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

I claim:

1. A method, comprising:
    receiving a user input at a user device, the user device running a host operating system with virtualization software running on the host operating system, the virtualization software managing at least one virtual machine, the virtual machine running a guest operating system;
    generating a message in response to the user input;
    comparing the message with a set of stored messages, wherein each message in the set of stored messages can be properly executed by targets in both the host operating system and the virtual machine; and
    if the message matches a message in the set of stored messages, then generating a notice soliciting the user for additional input in order to determine whether the user input is intended for the host operating system or the virtual machine.

2. The method of claim 1, wherein each message in the set of stored messages would produce a different response depending on whether the message is executed in the host operating system or in the virtual machine.

3. The method of claim 1, further comprising:
    receiving a user response to the notice;
    determining, by the host operating system, based on the user response, whether to direct the message to a target in the host operating system or to a target in the virtual machine.

4. The method of claim 1, further comprising:
    receiving a user response to the notice;
    determining, based on the user response, that the user input is intended for the virtual machine; and
    directing the message to the virtualization software.

5. The method of claim 1, further comprising:
    receiving a user response to the notice;
    determining, based on the user response, that the user input is intended for a target in the host operating system; and
    directing the message to a target in the host operating system.

6. The method of claim 1, wherein, if the message does not match a message in the set of stored messaged, then determining, by the host operating system, whether to direct the message to a target in the host operating system or to a target in the virtual machine.

7. The method of claim 1, further comprising generating an interrupt in the host operating system while the host operating system determines whether to direct the message to a target in the host operating system or to a target in the virtual machine.

8. A computing device, comprising:
   at least one processor; and
   memory including instructions that, when executed by the at least one processor, cause the computing device to perform the steps of:
      receiving a user input at a user device, the user device running a host operating system with virtualization software running on the host operating system, the virtualization software managing at least one virtual machine, the virtual machine running a guest operating system;
      generating a message in response to the user input;
      comparing the message with a set of stored messages, wherein each message in the set of stored messages can be properly executed by targets in both the host operating system and the virtual machine; and
      if the message matches a message in the set of stored messages, then generating a notice soliciting the user for additional input in order to determine whether the user input is intended for the host operating system or the virtual machine.

9. The computing device of claim 8, wherein each message in the set of stored messages would produce a different response depending on whether the message is executed in the host operating system or in the virtual machine.

10. The computing device of claim 8, wherein the memory further includes instructions that when executed by the at least one processor, cause the computing device to perform the steps of:
   receiving a user response to the notice;
   determining, by the host operating system, based on the user response, whether to direct the message to a target in the host operating system or to a target in the virtual machine.

11. The computing device of claim 8, wherein the memory further includes instructions that when executed by the at least one processor, cause the computing device to perform the steps of:
   receiving a user response to the notice;
   determining, based on the user response, that the user input is intended for the virtual machine; and
   directing the message to the virtualization software.

12. The computing device of claim 8, wherein the memory further includes instructions that when executed by the at least one processor, cause the computing device to perform the steps of:
   receiving a user response to the notice;
   determining, based on the user response, that the user input is intended for a target in the host operating system; and
   directing the message to a target in the host operating system.

13. The computing device of claim 8, wherein, if the message does not match a message in the set of stored messaged, then determining, by the host operating system, whether to direct the message to a target in the host operating system or to a target in the virtual machine.

14. The computing device of claim 8, wherein the memory further includes instructions that when executed by the at least one processor, cause the computing device to perform the steps of:
   generating an interrupt in the host operating system while the host operating system determines whether to direct the message to a target in the host operating system or to a target in the virtual machine.

15. A non-transitory computer readable storage medium comprising one or more sequences of instructions, the instructions when executed by one or more processors causing the one or more processors to execute the operations of:
   receiving a user input at a user device, the user device running a host operating system with virtualization software running on the host operating system, the virtualization software managing at least one virtual machine, the virtual machine running a guest operating system;
   generating a message in response to the user input;
   comparing the message with a set of stored messages, wherein each message in the set of stored messages can be properly executed by targets in both the host operating system and the virtual machine; and
   if the message matches a message in the set of stored messages, then generating a notice soliciting the user for additional input in order to determine whether the user input is intended for the host operating system or the virtual machine.

16. The non-transitory computer readable storage medium of claim 15, wherein each message in the set of stored messages would produce a different response depending on whether the message is executed in the host operating system or in the virtual machine.

17. The non-transitory computer readable storage medium of claim 15, further comprising instructions that when executed by the one or more processors cause the one or more processors to execute the operations of:
   receiving a user response to the notice;
   determining, by the host operating system, based on the user response, whether to direct the message to a target in the host operating system or to a target in the virtual machine.

18. The non-transitory computer readable storage medium of claim 15, further comprising instructions that when executed by the one or more processors cause the one or more processors to execute the operations of:
   receiving a user response to the notice;
   determining, based on the user response, that the user input is intended for the virtual machine; and
   directing the message to the virtualization software.

19. The non-transitory computer readable storage medium of claim 15, further comprising instructions that when executed by the one or more processors cause the one or more processors to execute the operations of:
   receiving a user response to the notice;
   determining, based on the user response, that the user input is intended for a target in the host operating system; and
   directing the message to a target in the host operating system.

20. The non-transitory computer readable storage medium of claim 15, wherein, if the message does not match a message in the set of stored messaged, then determining, by the host operating system, whether to direct the message to a target in the host operating system or to a target in the virtual machine.

* * * * *